April 13, 1937.  G. F. BAHR  2,077,303
TELLTALE SIGNAL
Filed Feb. 21, 1936
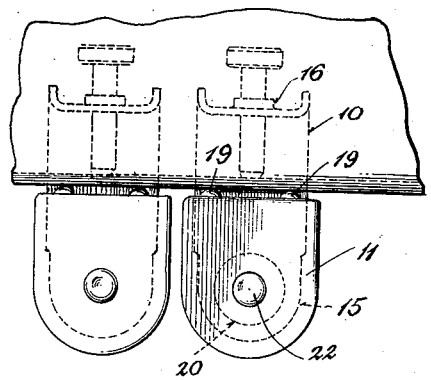
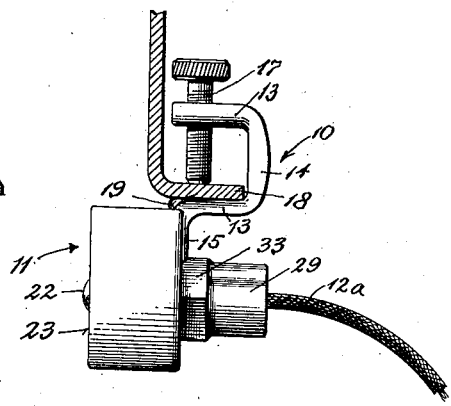
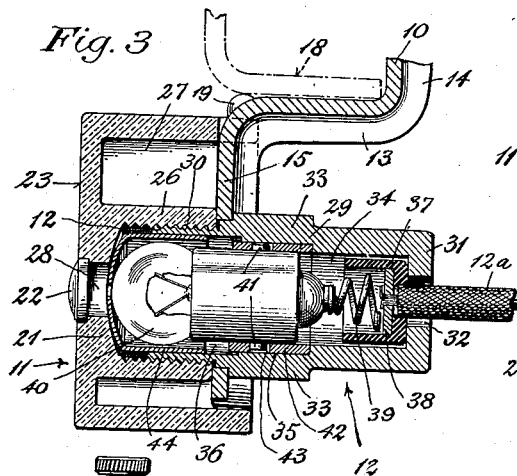
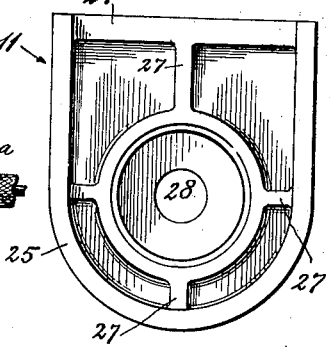
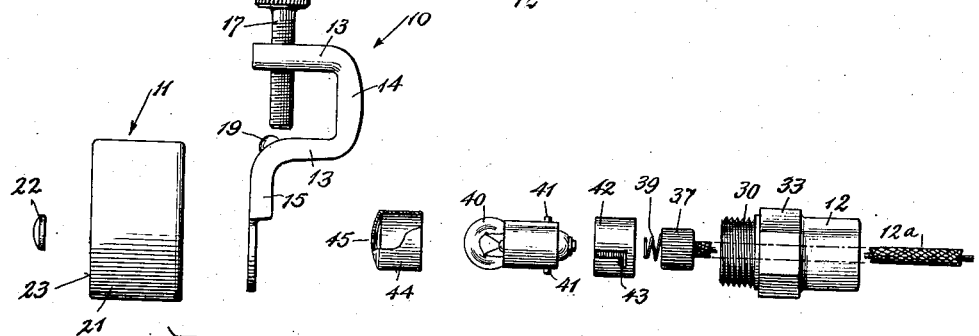
INVENTOR
Gustave F. Bahr
BY
ATTORNEY Patented Apr. 13, 1937

2,077,303

UNITED STATES PATENT OFFICE 2,077,303

TELLTALE SIGNAL

Gustave F. Bahr, Fairfield, Conn., assignor to Casco Products Corporation, Bridgeport, Conn., a corporation of Connecticut Application February 21, 1936, Serial No. 65,039

9 Claims. (Cl. 177—329)

This invention relates to telltale or monitor signals, and more particularly to an improved signal light for use in automobiles and the like, to inform the operator whether electric circuits are switched on or off.

An object of this invention is to provide an improved telltale signal light for automobiles which is easily attached to the dashboard of a car.

Another object of the present invention is to provide a telltale signal so constructed that a number of said signals may be mounted side by side to form a signal bank or group, each signal being independently operative.

A feature of this invention is the provision of electrical connecting means therein whereby only a single wire need be connected to the particular circuit which is to be monitored.

Another feature of the present invention is the provision of a telltale signal light which is extremely simple and economical to manufacture.

A further feature of the present invention is the provision of strong and sturdy supporting and cover parts, thereby eliminating any likelihood of damage or breakage.

A still further feature of the present invention is the provision of means for confining and restricting the illumination from the telltale signal, making it possible to use a standard sized bulb without causing annoyance to the operator's eyes, and at the same time permitting the signal to be easily visible.

Other features and advantages will hereinafter appear.

In the accompanying drawing:

Figure 1 is a front view of two telltale signal lights of the present invention mounted on a portion of an automobile dash board.

Fig. 2 is a side view of one of the signal lights of Figure 1.

Fig. 3 is an enlarged longitudinal sectional view of the telltale signal, but with part of the mounting bracket cut away.

Fig. 4 is an exploded view of the telltale signal light.

Fig. 5 is a rear view of the molded front or body portion of the signal.

The telltale signal light of the present invention includes a bracket 10, a molded front structure or cover 11, a lamp-receptacle rear housing 12, and a connecting wire 12a.

The bracket 10 is preferably made from a metal stamping, and comprises a U-shaped clamping portion having legs 13 and neck 14, and an integral extension 15 on the lower of said legs and at substantially right angles to it, said extension being adapted to support the cover 11 and rear housing 12 of the signal. The legs 13 and neck 14 of the bracket 10 are of channel section to provide the clamp with strength and rigidity, and an upper portion of the extension 15 is also of channel section.

In the upper leg 13 of the clamp there is provided a threaded boss 16, see Figure 1, which accommodates a clamping screw 17 for securing the bracket 10 to the flange 18 of an automobile dashboard. In order to provide for a secure gripping of the flange 18 by the lower leg 13 of the clamp, there are provided at the extremity of said leg small projections 19 which further engage and hold said flange. The extension 15 of the lower leg 13 has a circular aperture 20 therein, (Fig. 1), and the lower end of said extension is semi-circular for reasons hereinafter explained.

The cover 11, as shown, incorporates a molded structure cover 21, and a translucent lens 22 carried thereby. The structure 21 may be made of any suitable material, but preferably it is molded from a thermoplastic substance such as cellulose acetate, and comprises a front face 23, outside walls 24, 25, a tubular hub 26, and ribs 27. The wall 25 is of U-shape, while the wall 24 is straight, joining the extremities of the U. The ribs 27 extend inwardly from the wall 25 to the tubular hub 26.

A stepped aperture 28 is provided in the face portion 23 of the cover 11, said aperture being axially aligned with the hub 26, and opening into the recess of said hub, and said aperture serves to support the translucent lens 22, which is cemented therein, and also serves to expose said lens to a source of light below mentioned.

The lamp-receptacle housing 12 incorporates a shell 29 having on a front reduced end thereof an external thread 30, and having at its other end an integral end closure 31 with an aperture 32 therein. This housing is preferably of metal.

Intermediate the ends of the shell 29 is a hexagonal portion 33 which permits said shell to be gripped by a suitable wrench or spanner. The recess of the shell 29 is stepped to provide a bore 34 of small diameter, a bore 35 of intermediate diameter, and a bore 36 of large diameter. The bore 34 accommodates an insulating cup 37 having an apertured bottom, said bottom being juxtaposed to the end closure 31 of the shell 29.

A metallic washer 38 is carried in the insulating cup 37 against the bottom thereof, and said washer has soldered to it the end of the conducting wire 12a.

It will be noted that the insulation of the wire 12a is brought through the end closure 31 of the shell 29 and within the aperture in the bottom of the cup 37, thereby effectively insulating the conductor of said wire from said shell.

A conical spring 39 is held by the cup 37, and said cup, spring and the washer 38 together with the wire 12a comprise the means within the housing 12 for conducting electricity to the center or tip contact of an incandescent bulb 40 carried by said housing.

The bulb 40 has the usual bayonet studs 41 for retainers, and said bulb is accommodated in a metal sleeve 42 having bayonet slots 43 therein.

The sleeve 42 also is longitudinally slotted, and said sleeve is biased open slightly, so as to be frictionally held in the bore 35 of the shell 29 after being forced into the same. When thereafter the bulb 40 is inserted in the housing 12, the spring 39 is compressed by the center or tip contact of the bulb, and said bulb is locked in position by turning it clockwise, the constant pressure exerted by the spring 39 preventing loosening or disengagement from the receptacle. Contact is made to the bulb 40 through the shell 29 and the wire 12a and spring 39.

The rear housing 12 and front cover 11 of the signal light are supported on the interposed bracket 10 by passing the threaded portion 30 of the shell 29 through the aperture 20 of the bracket, and screwing said threaded portion into the hub 26 of the front cover, said hub being suitably threaded therefor, so that the extension 15 of the bracket 10 is tightly clamped between said hub and the hexagonal portion 33 of the shell 29.

The shape of the lower portion of the bottom-depending extension 15 of the bracket 10 is such, semicircular as aforesaid, that said extension fits within the U-shaped wall 25 of the front cover 11, and said wall is sufficiently high to extend over the edges of said extension, thereby preventing relative movement between the bracket 10 and the front cover 11 when the latter is mounted on said bracket. This is an important feature, since the front cover 11 is thus aligned and positioned by the bracket with respect to the dashboard of a car, and turning of said cover is also prevented during the tightening of the shell 29. The wall 24 of the cover 11 abuts the front face of the bracket extension 15, and provides for further rigidity and strength of mounting.

When the front cover 11 is molded of a thermoplastic substance such as cellulose acetate (which after being molded is more or less translucent), it is desirable to shut off the light radiated by the incandescent bulb 40 from said cover, so that only the lens portion 22 will show illumination outwardly. Accordingly, the combination shown includes a metallic cup 44 having a small aperture 45 in the bottom thereof, said cup being placed over the glass portion of the bulb 40 and fitting slidably in the bore 36 of the shell 29, thereby confining the light from said bulb and permitting only a small beam to impinge on and illuminate the lens 22.

Electrical connection is made from the appliance side of the switch in the circuit to be monitored, to the telltale signal by means of the wire 12a, the return signal connection being through the clamping bracket 10, to the ground through the dashboard of the car. According to this arrangement, representing a now preferred utilization of the invention, the signal is operative only when the switch is closed.

Variations and modifications may be made within the scope of this invention and portions of the improvements may be used without others.

I claim:

1. In a combined telltale signal light for automobile electrical circuits and an inbuilt but projecting element to facilitate mounting of said light at an appointed location by way of the projecting part of said element, the combination of said element, the same including an apertured arm; an incandescent electric bulb; a receptacle therefor including a shell having a circumferential abutment thereon and having a threaded end portion, said abutment for engaging said apertured arm and said end portion for passing through the aperture in said arm; and a cover structure having a threaded recess for taking said threaded end portion, said cover being screwed to said shell so as to urge said arm tightly against the abutment of the shell.

2. The invention as defined in claim 1, in which there is a substantially opaque cup having an apertured bottom, said cup slidably fitting into said shell and over the glass part of said bulb for confining and directing light rays from the latter.

3. In a combined telltale signal for automobile electrical circuits and an inbuilt but projecting element to facilitate mounting of said light at an appointed location by way of the projecting part of said element, the combination of said element, the same including an apertured arm; a cover structure having a recess, an aperture beyond said recess and a threaded entrance to said recess; an illuminable member held in said recess of said cover; an incandescent bulb; and a receptacle therefor including a shell having a circumferential abutment thereon and having a threaded end portion passing through the aperture in said arm and screwing into the threaded entrance to said cover structure to clamp said arm against the abutment of said shell.

4. The invention as defined in claim 1, in which keying means are provided and which means is partially carried by said cover structure and partially carried by said arm to prevent relative movement between the cover structure and the arm.

5. The invention as defined in claim 1, in which the receptacle includes a sleeve slidably fitting over the barrel of the bulb, a forwardly facing insulating cup within the sleeve in rear of said barrel, and a spring in said cup for forcing the bulb forwardly and the cup rearwardly.

6. The invention as defined in claim 1, in which the threaded portion of the shell of the receptacle extends around the glass part of the bulb.

7. The invention as defined in claim 3, in which there is means for confining the light from said bulb and directing it on said illuminable member.

8. In a combined monitor signal for automobiles and an inbuilt but projecting element to facilitate mounting of said light at an appointed location by way of the projecting part of said element, the combination of said element, the same having an apertured arm; an assembly carried by said arm and including a cover structure having a recess in its rear illuminably connected to the front of said cover structure; a receptacle for an incandescent bulb including a shell within which the bulb is supported, said shell passing through the aperture in said arm and into the recess of the cover structure; and means for removably retaining the shell in said recess and for preventing movement of said assembly relative to the arm of said clamp.

9. The invention as defined in claim 8, in which the cover structure includes an illuminable member disposed at the front thereof in light conducting relation with said recess.

GUSTAVE F. BAHR.